Figure 1:
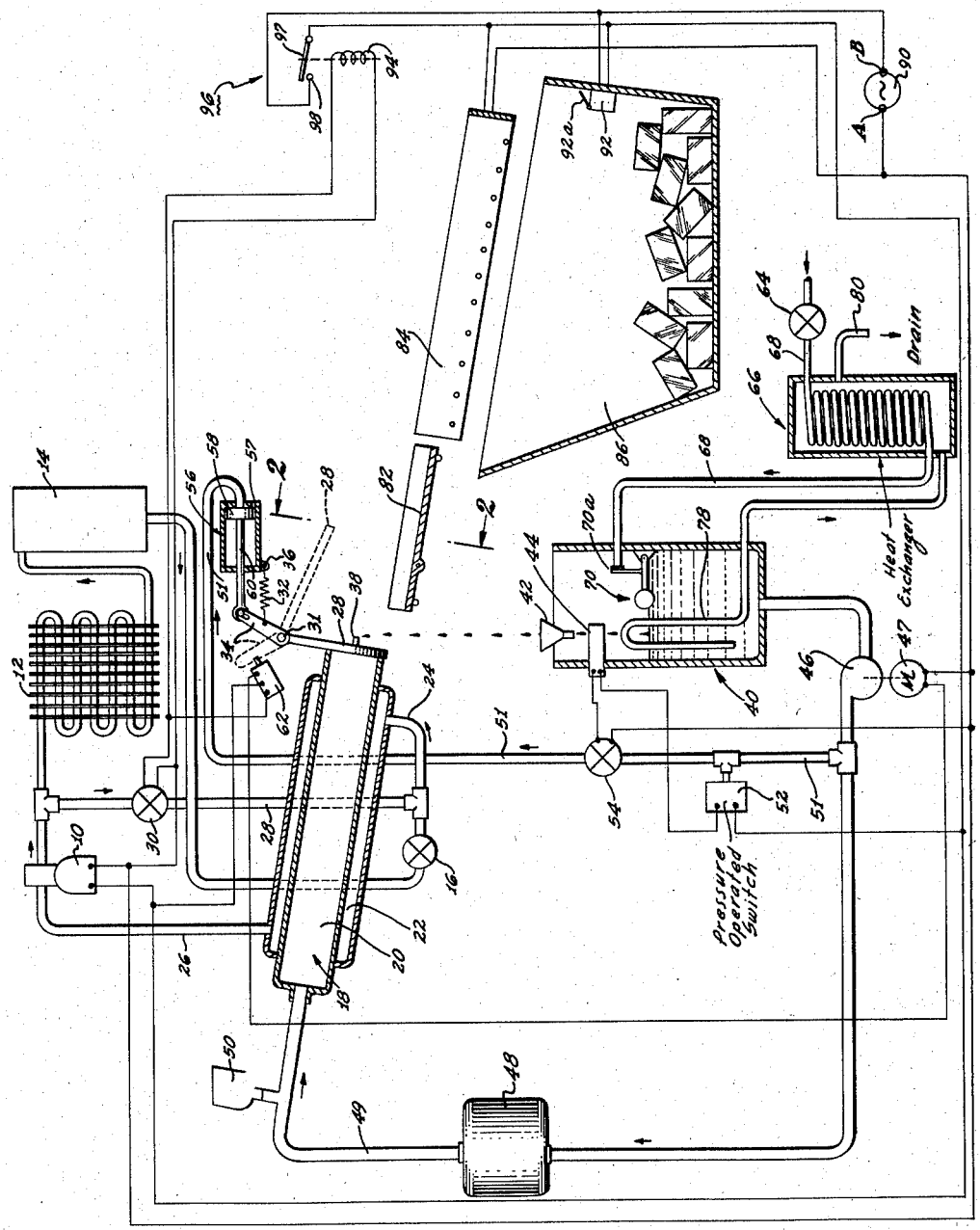

May 19, 1959 J. R. BATTEIGER 2,886,954
ICE MAKING APPARATUS
Filed July 25, 1956 3 Sheets-Sheet 1

INVENTOR.
Joseph R. Batteiger
BY
Smyth & Roston
Attorneys

May 19, 1959   J. R. BATTEIGER   2,886,954
ICE MAKING APPARATUS

Filed July 25, 1956   3 Sheets-Sheet 2

INVENTOR.
Joseph R. Batteiger

BY
Attorneys

United States Patent Office 2,886,954
Patented May 19, 1959

2,886,954

ICE MAKING APPARATUS

Joseph R. Batteiger, Los Angeles, Calif.

Application July 25, 1956, Serial No. 599,949

12 Claims. (Cl. 62—135)

The present invention relates to improved refrigerating apparatus, and it is directed more particularly to improved ice making apparatus which is automatically controlled to maintain one or more dispensing bins filled with crushed ice or ice cubes.

The term "ice cubes" will be used generically in the ensuing description to refer to small blocks of ice which need not necessarily be cubical in form, but may be, for example, of cylindrical or other shape.

Many different types of apparatus and machines for automatically manufacturing ice cubes or crushed ice have been conceived and many are in present commercial use. For the most part, these machines are effective in performing their intended function. However, most suffer from the disadvantage of being unduly expensive. The main object of the present invention is to provide improved apparatus which is relatively simple and inexpensive in its construction and yet which functions efficiently and in a fully automatic manner to maintain a desired supply of ice cubes in a dispensing bin.

The above objective is achieved in one embodiment of the invention by circulating water through an evaporator which includes a tubular freezing compartment. The circulation of the water is continued until a cylinder of ice has been formed in the freezing compartment, and the formation of such a cylinder interrupts the water circulation. This interruption of the water circulation automatically terminates the refrigerating of the freezing compartment and produces a heating effect around the walls of the compartment to release the ice cylinder. The freezing compartment is preferably inclined to the horizontal so that the released ice cylinder can slide out of it under the influence of gravity. The ice cylinder is then introduced to an ice cutting or crushing mechanism of any suitable type for forming it into ice cubes or into crushed ice.

In a manner to be described, the capacity of the ice making machine of the invention can be increased by using a multiplicity of freezing compartments. These compartments can be interconnected so that a common refrigerating system can be used if so desired. In an arrangement using a common refrigerating system, means is provided for terminating each freezing cycle after the last cylinder of ice has been completely formed in its corresponding freezing compartment.

Also, appropriate means is provided for reinitiating each succeeding freezing cycle after the last cylinder of ice has been discharged from its corresponding freezing compartment.

Figure 2:
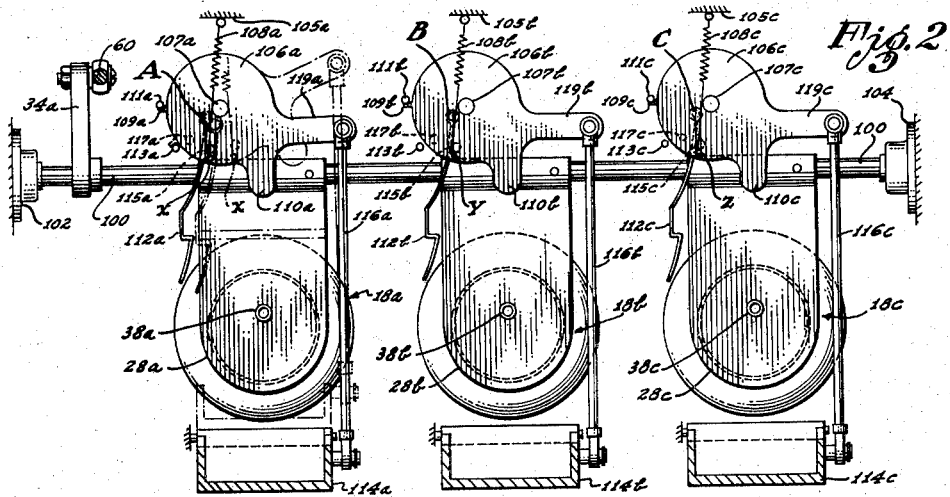
Figure 4:
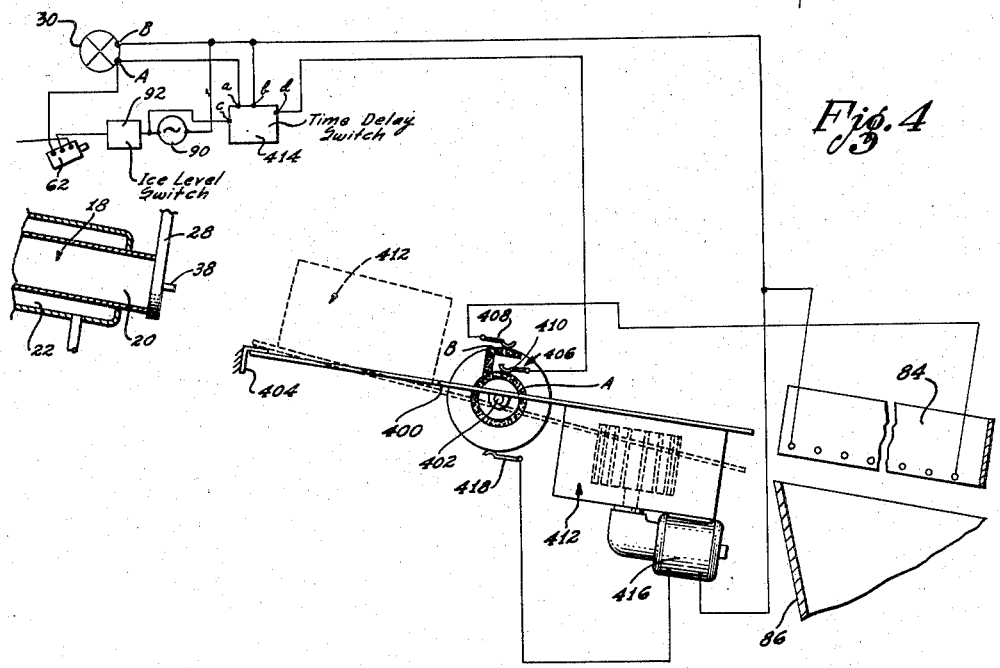
Figure 3:
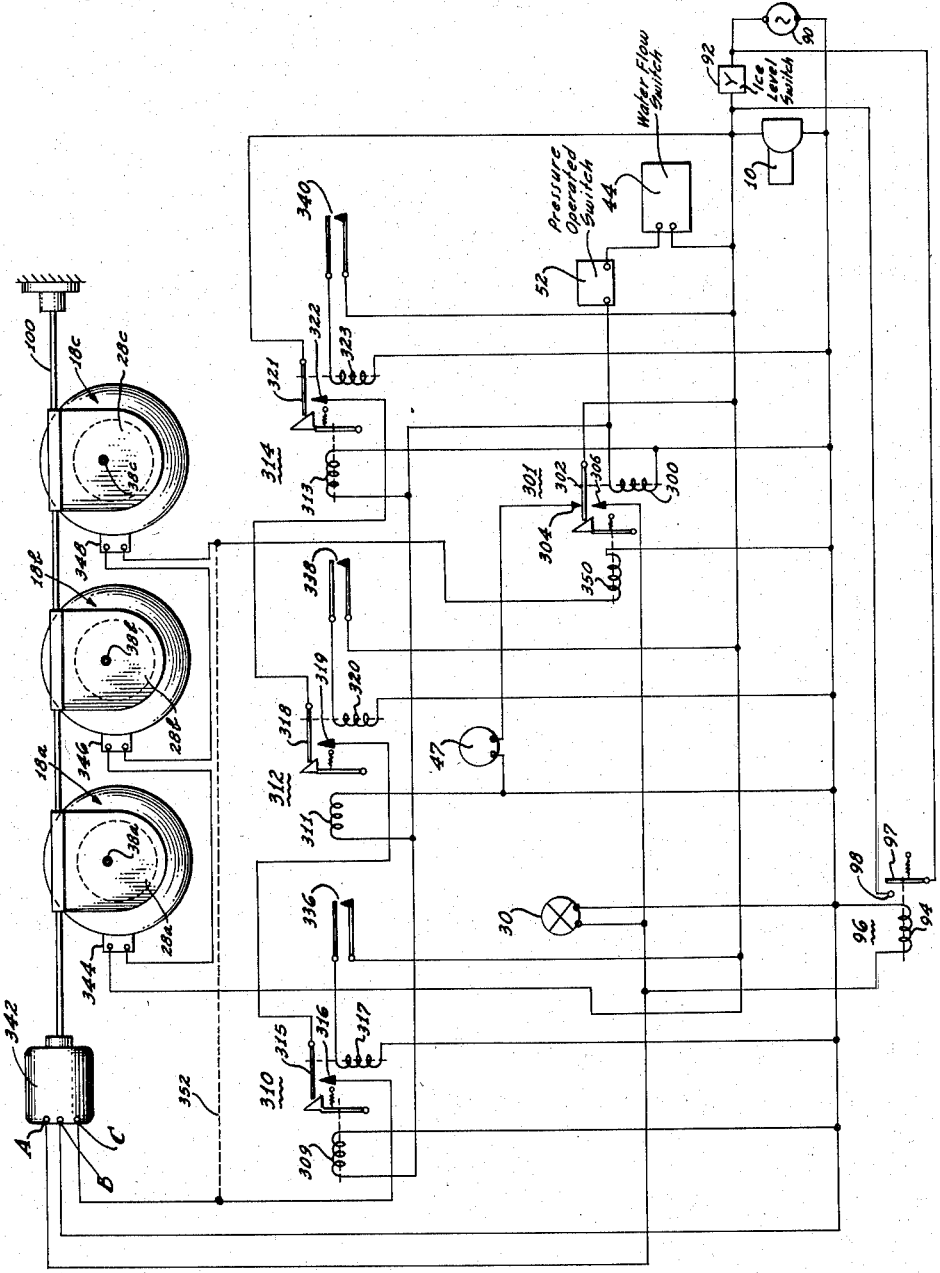

Other features and advantages of the present invention will be hereinafter apparent from the following description, particularly when taken in connection with the accompanying drawings, in which, Figure 1 is a somewhat schematic representation of one embodiment of the improved ice making apparatus and system of the invention, and the illustrated embodiment is capable of automatically maintaining a dispensing bin full of ice cubes;

Figure 2 is an end view substantially on the line 2—2 of Figure 1 and shows a multiple freezing compartment system, this figure illustrating in detail a mechanically controlled flap mechanism for retaining water in the freezing compartments during the freezing cycles and for controlling freezing apparatus to terminate the respective freezing cycles and initiate a discharge operation when an ice cylinder is formed;

Figure 3 is an end view of a multiple tube system of the type shown in Figure 2 but which uses a predominate electrical control for the flap mechanism rather than a mechanical control; and Figure 4 is a fragmentary view showing a modification to the apparatus and system of Figure 1 which enables it to be conveniently conditioned for the automatic production of ice cubes or of crushed ice, whichever is desired at any particular time.

The apparatus of Figure 1 includes a freezing or refrigerating system which, in turn, includes a compressor 10 of suitable known construction for compressing a refrigerant and for circulating the refrigerant around the system. The compressor 10 is connected by a suitable conduit to a condenser 12, and the condenser in turn is connected to a storage receiver 14 of usual construction. The receiver 14 is connected through an expansion means 16 to an evaporator 18. The expansion means may be a capillary tube, an expansion valve, a thermostatic expansion valve, a float or any other known device that may be used for enabling the refrigerant from the receiver 14 to expand into the evaporator 18.

The evaporator 18 in the embodiment illustrated in Figure 1 is made up of an inner tubular freezing compartment 20 which is surrounded by an outer coaxial tubular expansion chamber 22. However, the freezing compartment and expansion chamber can have any desired suitable configuration. The expansion means 16 is connected to an inlet at one end of the chamber 22 by a conduit 24, and a suction conduit 26 connects an outlet at the other end of this chamber to the intake of the compressor 10. A by-pass conduit 28 extends from the outlet of the compressor to the conduit 24, and this by-pass conduit is closed during the refrigerating cycles by a solenoid actuated valve 30.

The evaporator 18 is inclined to the horizontal in the illustrated manner. The freezing compartment 20 has, therefore, a downwardly sloping path from its inlet which is at the left of the drawing to its outlet which is at the right of the drawing. The outlet of the freezing compartment 20 is normally closed by a flap cover 28 which is pivotally mounted on a suitable shaft 31. The shaft 31 is supported by any appropriate stationary bracket means (not shown). The flap 28 is fixedly mounted on the shaft 31 so as to be rotated when the shaft is rotated. A radial arm 34 is also fixedly mounted on the shaft 31. Actuation of the arm 34 causes the shaft 31 to rotate which, in turn, serves to open or close the flap 28. A spring 32 extends between the arm 34 and a suitable stationary bracket 36. This spring biases the shaft 31 in a clockwise direction to hold the flap 28 in a normally closed position with respect to the outlet of the freezing compartment 20 of the evaporator 18. The flap 28 has a small outlet tube 38 extending through an aperture in the flap, and this tube is situated substantially at the annular center of the flap. The purpose of the tube 38 is to pass water that is circulated through the freezing compartment 20 back to the circulating system, as will be described.

An open sump tank 40 is provided, and a funnel 42 is mounted at the top of the tank in a position to catch the water flowing from the tube 38 in the flap 28. An electric flow switch 44 is mounted in the tank 40, and this switch is positioned under the funnel 42 so that water flowing through the funnel also passes through this switch. The switch 44 is constructed in known manner, and it maintains an opened electric contact so long as water flows through it.

An outlet at the bottom of the tank 40 is connected to the intake of a centrifugal water circulating pump 46, and this pump is driven by an electric motor 47. The outlet of the pump 46 is connected to the inlet of a cylinder 48. The outlet of the cylinder 48 is connected by a conduit 49 to the inlet of the freezing compartment 20 of the evaporator 18. An air vent valve 50 is provided in the conduit 49 adjacent the inlet of the freezing compartment 20. The valve 50 may, for example, be of the float valve type, and whenever the liquid level drops the float opens the valve.

The outlet of the water circulating pump 46 is also connected through a conduit 51 to the inlet of a hydraulic cylinder 56. A small aperture 57 is formed in the base of the cylinder 56 to permit liquid to drain from the cylinder for reasons to be described. The conduit 51 includes a pressure-operated switch 52, which is constructed in known manner to close its electric contacts whenever the water pressure in the conduit 51 exceeds a certain threshold. The conduit 51 also includes a solenoid-actuated valve 54 of usual construction. The hydraulic cylinder 56 is supported by any suitable stationary means (not shown), and this cylinder is positioned adjacent the arm 34 on the shaft 31. A piston 58 is slidable in the cylinder 56, and this piston has a connecting rod 60 which is coupled to the arm 34. The introduction of water pressure into the cylinder 56 causes the piston 58 to move to the left of the cylinder in the illustrated view, and this pivots the flap 28 against the bias of the spring 32 to its open position. When the water pressure is removed, the spring 32 pivots the arm 34 to close the flap 28 and to return the piston 58 to its original position.

The open position of the flap 28 is shown by the dashed lines of Figure 1. When the flap 28 is in its open position, the arm 34 engages a spring biased single-pole-double-throw switch 62. The switch 62 has a center terminal which is connected to its lower outer terminal when the switch is engaged by the arm 34 and which is connected to its upper outer terminal when the switch 62 is not so engaged.

Make-up water is introduced to the system from a suitable water source (not shown) through a conduit 68 having a valve 64 and through a heat exchanger 66. The conduit 68 is coiled in the heat exchanger, and this conduit is connected to the sump tank 40 at a point above the level at which water is to be maintained in that tank. A float valve 70 in the sump tank 40 closes the end of the conduit 68 when the desired level is reached in the sump tank and this prevents water from flowing into the sump tank as long as that level is maintained.

The float valve 70 is pivotally mounted to one side of the tank 40 and it includes an outwardly extending arm 70a. This arm is forced against the end of the conduit 68 to close and seal the conduit 68 when the liquid in the sump tank reaches the desired level.

A siphon 78 is mounted in the sump tank 40, and water flows through the siphon to the heat exchanger 66 whenever the level in the sump tank 40 exceeds that necessary to initiate the siphoning action. The heat exchanger 66 includes a suitable drain pipe 80 which extends from a point on the side of the heat exchanger above the level at which water is to be maintained in the heat exchanger.

A chute 82 is mounted adjacent the outlet of the freezing compartment 20, and this member transports the ice cylinders as they issue from the freezing compartment onto an electric ice cutting unit 84. The unit 84 includes a series of electrically conductive wires which extend in generally spaced parallel relation across the respective ice cylinders introduced into the unit. The electric wires in the unit 84 are disposed on a diminishing radius with respect to the path of the ice cylinders entering the unit, and this prevents snagging of the wires by the ice cylinders. When the wires are electrically energized, they heat up and so melt through the ice cylinder. This cauess the cylinder to fall in the form of ice cubes into a receiving bin 86 under the ice cutting unit 84. If so desired, the electric ice cuttng unit 84 can be replaced by any suitable ice cube forming mechanism, or a mechanical ice crusher can be used when crushed ice is required.

The system of Figure 1 is connected to a suitable source 90 of electric energy, such as the usual 110 volt alternating current mains. One side "A" of the source 90 is connected to one terminal of the drive motor 47 of the pump 46, to one terminal of the solenoid valve 54, to one terminal of the drive motor for the compressor 10, to one terminal of the solenoid valve 30, and to one terminal of the ice cutting unit 84. The other side "B" of the source 90 is connected through a level switch 92 in the bin 86 to the other terminal of the ice cutting unit 84, to one terminal of the pressure operated switch 52, to the other terminal of the driving motor for the compressor 10, and to the center terminal of the switch 62.

The level switch 92 in the bin 86 is mechanically actuated by the weight of the ice cubes in the bin. This switch is closed whenever sufficient ice cubes have been used to free the actuating arm 92a of the switch. This arm is then pivoted under a spring bias in a counter-clockwise direction to close the switch. When the bin is again full, the weight of the ice cubes forces the actuating arm 92a in a clockwise direction against its spring bias to open the switch. Other suitable mechanical or thermal control means can be used to close the circuit whenever the level of ice cubes in the dispensing bin 86 drops below a predetermined level.

The other terminal of the pressure operated switch 52 is connected through the flow switch 44 to the other terminal of the solenoid valve 54. The upper outer terminal of the switch 62 is connected to the drive motor 47 of the circulating pump 46 so that this motor is energized whenever the flap 28 is closed. The lower outer terminal of the switch 62 is connected to the other terminal of the solenoid valve 30 so that this valve is energized and opened whenever the flap 28 is opened. A relay 96 has its energizing widing 94 connected across the terminal of the solenoid valve 30, and this relay closes its arm 97 against its contact 98 to short circuit the switch 92 whenever the valve 30 is energized.

The system of Figure 1 is first placed into operation by opening the valve 64 in the water inlet conduit 68. This allows water from the source to enter and fill the sump tank 40 up to the predetermined level. The flow of water into the sump tank is then stopped by the float valve 70. Assuming that the ice cube level in the bin 86 is below the required level, the actuating arm 92a of the switch 92 will be held in its position to close the switch 92. Also, the flap 28 of the freezing compartment 20 will be closed, and the switch 62 will complete an electric circuit from the source 90 to the motor 47 to start up the pump 46. The pump now circulates water from the tank 40 through the cylinder 48 and through the conduit 49 into and through the freezing compartment 20 of the evaporator 18. This water flow causes the valve 50 to be filled with water and closed. The closed flap 28 holds a quantity of water in the freezing compartment 20, but some of the water flows out through the small tube 38 in the aperture in the flap 28 and down through the funnel 42 and through the flow switch 44 back to the tank 40. This circulation continues so long as there is a free passage through the freezing compartment 20 of the evaporator 18.

In a manner to be described, the refrigerating apparatus associated with the evaporator gradually freezes the water flowing through the freezing compartment 20, and an ever thickening wall of ice is built up around the inner surface of the tube. Finally, when a cylinder of ice is formed completely across the cross section of the freezing compartment 20, the water circulation is stopped. So long as the circulation continues, however, the flow switch 44 maintains the solenoid valve 54 in a deenergized condition and the conduit 51 to the hydraulic cylinder 56 is kept closed.

During the water circulating operation described above, it will be remembered that the switch 92 in the ice bin is closed. Also, while the flap 28 at the outlet of the freezing compartment 20 remains closed, the switch 62 is in an operating position in which it opens energizing circuit to the solenoid valve 30 to close that valve. Therefore, no refrigerant can flow in the conduit 28. The energizing circuit to the drive motor of the compressor 10 is now closed, and this causes the compressor to circulate refrigerant through the refrigerating system in a manner normal to the cooling cycle. This refrigerant passes to the condenser 12 in gaseous form and it is cooled and condensed to a liquid in the condenser. The liquid refrigerant is then accumulated in the receiver 14 and then supplied to the expansion means 16. The expansion means allows the liquid refrigerant from the receiver 14 to expand into the expansion chamber 22 of the evaporator 18, and the refrigerant vaporizes in this chamber to produce a refrigerating effect to freeze the water circulating through the freezing compartment 20 of the evaporator 18.

The refrigerant is returned to the compressor through the suction conduit 26 and is recirculated until the water in the inner tube 20 of the evaporator is frozen to a solid cylinder. The freezing of the water in the freezing compartment 20 terminates the water flow through the tube 38 in the aperture in the flap 28 and over the flow switch 44. This causes the flow switch 44 to close an energizing circuit through the pressure operated switch 52 (which is now closed) to the solenoid valve 54. The solenoid valve 54 is therefore energized to open the conduit 51 to the hydraulic cylinder 56. The water from the circulating pump 46 now flows into the hydraulic cylinder 56 to create a pressure against the piston 58. The piston now moves to open the flap 28 and drive the arm 34 down against the actuating arm of the switch 62. This changes the position of the switch 62 to open the circuit to the motor 47 of the circulating pump 46 and stop the pump. The stopping of the pump removes the pressure from the piston 58, but the flap 28 is held in its open position by any suitable latching means, as will be described.

The stopping of the water circulating pump 46 also removes the water pressure from the inlet of the freezing compartment 20 and allows the air vent valve 50 in the conduit 49 to open. The opening of this valve permits the water in the cylinder 48 to fall back into the sump tank 40. It might be pointed out that the cylinder 48 is normally filled with water when the circulating pump 46 is operating, and there is sufficient water in this cylinder to raise the water in the sump tank 40 to a high enough level to initiate a siphoning action through the siphon 78 when the circulating pump is stopped. The siphoning action drains the sump tank 40 to remove the water used during the freezing cycle which has just been completed, the float valve 70 now opens the end of the conduit 68 to allow the tank 40 to fill with fresh make-up water for the next freezing cycle. This fresh make-up water is cooled in the heat exchanger 66 by the cold water siphoned from the sump tank 40 by the siphon 78. This removal of the water at the completion of each freezing cycle assures that there will be no excessive concentration of minerals in the ice cylinders from the freezing compartment which would otherwise destroy the crystal clear appearance of the ice cubes produced by the apparatus.

The opening of the valve 50 removes any vacuum effect that might otherwise be created at the inlet of the freezing compartment 20 by the receding column of liquid in the conduit 49. This vacuum would impede the removal of the ice cylinder that has now been formed.

When the flap 28 at the outlet of the freezing compartment first opens the ice cylinder does not immediately move out of the freezing compartment 20 because it is frozen to the inner walls of this compartment. However, the switch 62 is now actuated by the arm 34 to an operating position which completes an energizing circuit to the valve 30 so as to open the by-pass conduit 28. This permits the compressor 10 to feed the hot gaseous refrigerant directly to the expansion chamber 22 of the evaporator 18 to warm the walls of the freezing compartment 20 and free the ice cylinder that has now been formed in that compartment. When the ice cylinder is freed, it moves under gravity out of the evaporator and down the chute 82 to the electric ice cutting unit 84. It is formed into cubes in the unit 84, in the manner described, and these cubes fall down into the bin 86.

When the ice cylinder leaves the freezing compartment 20 of the evaporator 18 the flap 28 is closed by spring 32 in a manner to be more fully described. During this time, sufficient water drains out of the cylinder 56 through the aperture 57 to allow the piston to move under the pressure of spring 32 back to the base of the cylinder. The closing of the flap 28 causes the switch 62 to move to its other operating position to deenergize the valve 30 and to energize the motor 47 and start the water circulating pump 26. This action initiates another freezing cycle. It should be noted that even though the water does not flow over the flow switch 44 immediately at the beginning of this second freezing cycle, the solenoid valve 54 is not energized as there is not enough pressure in the conduit 51 to actuate and close the pressure operated switch 52. Therefore, the conduit 51 remains closed at the beginning of this freezing cycle (as is desired), and there is no tendency for the piston 58 to move and open the flap 28. The actuation threshold of the pressure switch 52 is adjusted to correspond to the full operating water pressure in the system. Therefore, by the time sufficient pressure has been built up in the lower part of the conduit 51 to actuate and close the pressure operated switch 52, the water flow is established through the switch 44 to open that switch. Therefore, the solenoid valve 54 is not energized and the conduit 51 is not opened, until an ice cylinder has again completely formed in the freezing compartment 20.

These freezing and discharge cycles are repeated until the bin 86 is filled with ice cubes. When this is accomplished the bin switch 92 is opened and this opens the energizing circuit to the ice cutter 84, to the compressor 10 and to the motor 47 of the water circulating pump 46. Therefore, the system is placed in a stand-by condition until the level of the ice cubes in the bin 86 drops below a predetermined point as the ice cubes are used up. The relay 96 is energized during each discharge operation of an ice cylinder from the freezing compartment of the evaporator 18 to short-circuit the switch 92 and preclude any possibility that the system will be deenergized until the ice cylinder has been completely discharged from the evaporator and deposited as ice cubes in the bin 86.

The apparatus of Figure 1 has been described on the basis of a single tubular freezing compartment 20 in the evaporator 18. However, as previously pointed out, multiple freezing compartments can be used either with a common refrigerating system or with independent refrigerating systems. The view of Figure 2 assumes a three freezing compartment system although more or less compartments, of course, can be used. Also, the view of Figure 2 assumes three separate evaporators 18a, 18b, and 18c with a single refrigerating system for all three.

The cover flaps 28a, 28b and 28c associated with the outlets of the respective freezing compartments in the evaporators 18a, 18b and 18c are fixedly mounted on a rotatable shaft 100, so that rotation of the shaft 100 causes all the flaps to open or to close. The shaft 100 is rotatably mounted at its opposite ends in a pair of bearings 102 and 104. These bearings are supported on suitable stationary brackets (not shown). The shaft 100 has an arm 34a which, like the arm 34 in Figure 1, may be operated by the piston 58 in the hydraulic cylinder 56. Therefore, when water pressure is introduced through the conduit 51 (Figure 1) to the cylinder 56, the piston 58 moves and causes the shaft 100 to rotate and open all the flaps 28a, 28b and 28c.

The flaps 28a, 28b and 28c have respective tubes 38a, 38b and 38c extending through corresponding apertures therein to circulate water through the evaporators as in the embodiment of Figure 1. Suitable means (not shown) is provided to direct the water from all the tubes 38a, 38b and 38c into the funnel 42 of Figure 1 so that a common water circulating system may be used. Also suitable branches extend from the conduit 49 of Figure 1 to the respective inlets of the freezing compartments of the evaporators 18a, 18b and 18c. Suitable interconnecting conduits also extend between the respective expansion chambers of the evaporators 18a, 18b and 18c so that the evaporators may operate from a common refrigerating system. A series of disc-like members 106a, 106b and 106c are rotatably mounted on respective shafts 107a, 107b, and 107c above the shaft 100. The shafts 107a, 107b, and 107c are supported in spaced relation on any appropriate means (not shown), and they extend parallel to one another and perpendicular to the axis of the shaft 100. The members 106a, 106b, and 106c are respectively positioned above the flaps 18a, 18b and 18c, and in their illustrated solid line position, these members are biased in a clockwise direction by respective springs 108a, 108b and 108c. These springs are affixed to the members 106a, 106b, and 106c at respective points X, Y, and Z adjacent the peripheries of these members, and the springs extend to suitable fixed brackets 105a, 105b, and 105c positioned directly above the respective shafts 107a, 107b, and 107c. These springs 108a, 108b, and 108c, in the illustrated solid line angular position of the members 106a, 106b, 106c are disposed to the left of the shafts 107a, 107b, 107c. Rotation of the members 106a, 106b, 106c by the respective springs in a clockwise direction beyond their illustrated solid lines positions is prevented by a series of radial projections 109a, 109b and 109c. These projections extend outwardly from the peripheries of the respective members and engage with a corresponding series of suitably mounted stationary stops 111a, 111b, and 111c.

The members 106a, 106b and 106c have respective integral tangential fingers 110a, 110b and 110c which extend downwardly in the solid line illustrated position of these members. These fingers are individually engaged by the flaps 28a, 28b and 28c when the flaps are moved to an opened position. The engagement of these fingers by the corresponding flaps causes the members 106a, 106b and 106c individually to rotate in a counter-clockwise direction about their shafts 107a 107b, 107c so that the springs 108a, 108b and 108c move to the other side of these shafts and bias the members 106a, 106b, and 106c in a counter-clockwise direction. It should be noted that the shafts 107a, 107b and 107c do not project past the front of their associated members 106a, 106b and 106c, and these shafts therefore do not interfere with the travel of the springs 108a, 108b and 108c across their respective axes. The counter-clockwise rotation of these members 106a, 106b, 106c is limited by the engagement of a plurality of stops 113a, 113b and 113c by the projections 109a, 109b and 109c.

A series of latches 112a, 112b, and 112c are pivotally mounted on the respetcive members 106a, 106b and 106c at respective points A, B and C. These points are displaced to the left of the respective shafts 107a, 107b, and 107c in the representation of Figure 2. A series of axial projections 115a, 115b and 115c on the respective members 106a, 106b, and 106c pivot the latches 112a, 112b and 112c in a counterclockwise direction out of engagement with the flaps 28a, 28b, and 28c when the members 106a, 106b, and 106c are in their illustrated solid line position. A further series of axial projections 117a, 117b and 117c moves the latches into engagement with the respective flaps when the members 106a, 106b, and 106c are cocked to their second angular position by the opening of the flaps. The action is such that the rotation of the shaft 100 to open the flaps 28a, 28b and 28c causes the flaps to engage the fingers 110a, 110b, and 110c and rotate the members 106a, 106b and 106c in a counter-clockwise direction from their first angular position to their second angular position, the members 106a, 106b, and 106c being retained in their second angular position by the off-center springs 108a,, 108b and 108c. At the same time the projections 117a, 117b, and 117c swing the latches 112a, 112b and 112c against the sides of the flaps. Subsequent release of the flaps causes them to drop out of the path of the fingers 110a, 110b and 110c into latched engagement with the latches 112a, 112b and 112c.

A series of treadles 114a, 114b and 114c are pivotally mounted below the outlets of respective ones of the evaporators 18a, 18b and 18c. The respective free ends of these treadles are coupled to the members 106a, 106b and 106c by a series of connecting rods 116a, 116b and 116c. These connecting rods are coupled at their upper extremities to respective transversely extending arms 119a, 119b and 119c. When the member 106a, for example, is rotated in a counterclockwise direction by the opening of the flaps to its second angular position (as shown by the dashed lines), it raises the free end of the treadle 114a to its upper position. Then, when a cylinder of ice leaving the evaporator 18a passes over the treadle 114a, the treadle is moved to its lower position. This rotates the member 106a in a clockwise direction so that it is returned to its first angular position which causes the projection 115a to release the latch 112a from the flap 28a. In a similar manner, the flaps 28b and 28c are individually unlatched when the cylinders of ice leave the evaporators 18b and 18c and actuate the treadles 114b and 114c. When all the flaps have become unlatched, indicating that the ice cylinders have left all the evaporators, the unlatched flaps 28a, 28b and 28c allow a spring (such as the spring 32 of Figure 1) to cause the arm 34a to rotate the shaft 100 and return the flaps to their closed position. As in the embodiment of Figure 1, the closure of all the flaps initiates another freezing cycle.

The control of the flaps 28a, 28b and 28c can be electrical instead of mechanical. One system for providing such an electrical control is shown, for example, in Figure 3. In the system of Figure 3, the hydraulic cylinder 56 and its associated control element 54 are not used. Instead, the water flow switch 44 and the pressure operated switch 52 of Figure 1 energizes the winding 300 of a latch relay 301. The pressure switch 52 may be moved directly to the outlet of the water circulating pump 46 to be closed only when full operating water pressure is built up in the line extending to the inlets of the evaporators. The conduit 51 extending to the hydraulic cylinder 56 is not used in this embodiment. The latch relay 301 has a movable arm 302 which is normally closed against a contact 304 but which is moved into latched engagement with the contact 306 when the winding 300 is energized. This relay 301 replaces the switch 62 of Figure 1, and it energizes the valve 30 in the refrigerating system (Figure 1) when the relay winding 300 is energized. The relay 301 also energizes the motor 47 of the water circulating pump 46 when it is deenergized and unlatched. The switches 44 and 52 are also connected to energize the unlatching windings 309, 311 and 313 of a series of latch relays 310, 312, and 314 when the relay 301 is first energized. For this purpose, these unlatching windings 309, 311 and 313 are connected in series with the switches 44 and 52 across the source 90.

The relay 310 has a movable arm 315 which is brought into latched engagement with a contact 316 when the relay winding 317 is energized. The relay 312 has a movable arm 318 which is brought into latched engagement with a contact 319 when the relay winding 320 is energized. The relay 314 has a movable arm 321 which is brought into latched engagement with a contact 322 when the relay winding 323 is energized. The winding 317 of the relay 310 is energized by the closure of a pair of contacts 336 disposed adjacent the mouth of the evaporator 18a. These contacts are normally resiliently biased to an open position and are mechanically and temporarily closed when an ice cylinder leaving this evaporator passes over them. This construction may be achieved in any convenient manner by mounting the contacts in the path of the ice cylinder as it leaves the evaporator. In like manner, the winding 320 of the relay 312 is energized by the temporary closure of a pair of normally open resilient contacts 338 which are positioned to be mechanically closed by an ice cylinder leaving the evaporator 18b; and the winding 323 of the relay 314 is energized by the temporary closure of a pair of normally open resilient contacts 340 which are positioned to be mechanically closed by an ice cylinder leaving the evaporator 18c.

The arm 315 of the relay 310 is connected to the contact 319 of the relay 312. The arm 318 of the relay 312 is connected to the contact 322 of the relay 314. The arm 321 of the relay 314 is connected through the level switch 92 (Figure 1) to one side of the source 90. The movable arm 302 of the relay 301 is also connected through the switch 92 to one side of the source 90, and the contact 306 of this relay is connected to one terminal "A" of a servo motor 342. The servo motor has a center terminal "B" connected to the other side of the source 90, and it has a terminal "C" connected to the contact 316 of the relay 310. The servo motor 342 is mechanically connected to the shaft 100, and it operates in known manner so that when an energizing circuit is completed between its terminals "A" and "B," the motor rotates the shaft 100 an amount sufficient to open the flaps 28a, 28b and 28c. Then, when the energizing circuit to the terminals "A" and "B" is opened, and an energizing circuit is established to the contacts "B" and "C" the servo motor 342 rotates the shaft 100 an amount sufficient to close the flaps 28a, 28b and 28c.

Three pressure switches 344, 346 and 348 are respectively associated with the evaporators 18a, 18b and 18c. These switches may be of known construction and are held in an open condition by the pressure in the evaporators during the freezing cycles. However, whenever a cylinder of ice leaves its corresponding evaporators freezing compartment, the pressure on the corresponding one of the switches 344, 346, and 348 is released and that switch closes. These switches are connected across the source 90 in series with each other and with the unlatching winding 350 of the relay 301.

In the embodiment of Figure 3, the freezing cycles are initiated as before by the closing of the level switch 92 in the bin 86 of Figure 1. Also, so long as the solenoid valve 30 is energized, this switch is short circuited by the relay 96 to assure that the system will not be turned off before the completion of a previously initiated ice discharge operation.

Now, at the completion of a freezing cycle, and when water no longer flows over the switch 44, this switch closes. Full operating water pressure now exists at the outlet of the circulating pump 46 (Figure 1) so that the switch 44 closes an energizing circuit through the pressure operated switch 52 to the winding 300 of the relay 301. This breaks the arm 302 from its contact 304 to deenergize the motor 47 of the water circulating pump 46 and causes the arm to make latched contact with contact 306 to energize the solenoid 30. The water circulating pump is stopped, therefore, and the refrigerating system is caused to circulate warm refrigerant through the evaporators 18a, 18b, and 18c to free the ice cylinders that have formed in the freezing compartments. The de-energizing of the motor 47 immediately drops the pressure at the outlet of the pump 46 so that the pressure operated switch 52 opens. However, the arm 302 of the relay 301 stays closed on its contact 306 due to the latching action of the relay.

The closure of the arm 302 on the contact 306 of the relay 301 also energizes the windings 309, 311 and 313 to unlatch the arms of the relays 310, 312 and 314. Also, the closure of the arm 302 on the contact 306 closes a circuit to the contact "A" of the servo motor 342 to energize this motor and cause it to rotate the shaft 100 in a direction to open the flaps 28a, 28b and 28c.

As the valve 30 causes warm refrigerant to circulate through the evaporators, the ice cylinders are freed one by one from the freezing compartments. As each ice cylinder leaves its freezing compartment, the corresponding one of the pressure switches 344, 346 and 348 is released and closes. Also, the corresponding contacts 336, 338 and 340 are mechanically closed by each ice cylinder as it leaves its evaporator and this brings the relays 310, 312 and 314 one-by-one to a latched closed condition. As the last one of the pressure switches 344, 346 and 348 closes, the unlatching winding 350 of the relay 301 is energized and this unlatches this relay and allows its arm 302 to return to the contact 304. This return of the arm 302 breaks the circuit to the terminals "A" and "B" of the servo motor 342, and deenergizes the solenoid valve 30 and reenergizes the drive motor 47 of the water circulating pump 46. Also, as the last one of the switches 336, 338 and 340 is temporarily closed to bring the last one of the relays 310, 312 and 314 to a latched closed condition, an energizing circuit is completed to the terminals "B" and "C" of the servo motor 342, and the motor now turns the shaft 100 in a direction to close the flaps 28a, 28b and 28c. The system is now in the condition to initiate another freezing cycle.

At the beginning of the reinitiated freezing cycle there is no water flow to the switch 44 so that this switch is closed. However, the water pressure in the system is now insufficient to close the switch 52 and the relay 301 is not energized. By the time the water pressure in the system has built up to the level required to close the switch 52, water will have started to flow over the switch 44 to open that switch. Therefore, the relay 301 is not energized until the formation of the ice cylinders in all the freezing compartments again interrupts the water flow to the switch 44. Also, as the water pressure builds up in the freezing compartments of the evaporators 28a, 82b and 28c, the pressure switches 344, 346, and 348 are again opened to deenergize the unlatching winding 350 of the relay 301.

The pressure switches 344, 346 and 348 may, for example, each have a spring biased plunger which is normally urged outwardly to close the switch. The plunger may coact with a suitable diaphragm such that the presence of water pressure in the corresponding freezing compartment causes the diaphragm to move the plunger inwardly against the spring bias to open the switch. When ice is formed in the compartment, the plunger does not have sufficient free movement to close the switch. However when the ice leaves the cylinder, the plunger is spring biased to the end of its travel against the diaphragm and the switch closes.

In the event of a power failure when the system is at a point in its freezing cycle where the flaps 28a, 28b and 28c are open and the cylinders are ready to discharge ice, there is a possibility of the ice blocks melting before they can actuate the switches 336, 338 and 340. Then, when the power comes on again, the system will start through its freezing cycle with the flaps open so that new ice blocks cannot be formed. To obviate this possibility, a connection 352 (shown by the broken line) can be made from the switch 348 to the terminal C by the servo motor 342. This connection will connect the terminals B—C of the servo motor across the source 90 when all three switches 344, 346 and 348 close. That is, when the pressure is removed from the freezing compartments 28a, 28b, 28c due to the ice leaving or melting or for any other reason, the servo motor 342 will be energized to close the flaps.

Protection similar to that described above can be given to the embodiment of Figure 2. This can be achieved by the provision of a solenoid mechanically coupled to the treadles 114a, 114b and 114c and which is connected to the power source. The solenoid is then arranged to trip the treadles in the event of a power failure so that the flaps 28a, 28b and 28c may be closed for the next freezing cycle.

The system of Figure 1 may be conveniently controlled by an electrical control system similar to that of Figure 3, rather than by the mechanical control system of Figure 2. This may be achieved by passing the liquid draining from the aperture 57 in the cylinder 58 through a conduit and by placing a solenoid operated valve in that conduit. Then, so long as the valve is closed, the liquid cannot drain from the cylinder 56 and the flap 28 cannot close. Now, in a multiple evaporator system, it is merely necessary for the relays 310, 312 and 314 to energize this valve when the last ice block has left the evaporators. This permits the liquid to drain from the cylinder 56 so that the spring 32 can close the flaps.

In the modification of Figure 4, the chute 82 of Figure 1 is replaced by a platform 400 which is pivotally mounted on a suitable shaft 402 at its center. The platform is adapted to be manually or otherwise rotated by approximately 180° in a counterclockwise direction from the illustrated first position to a second position. A stop 404 is provided to retain the platform in either its first position or in its second position. A commutator 406 is affixed to one side of the platform 400 and the commutator is rotated about the shaft 402 when the platform is rotated. One terminal of the ice cutting unit 84 is connected to a brush 408 associated with the commutator. The other terminal of this unit is connected to the terminal "B" of the solenoid valve 30. A second brush 410 associated with the commutator is connected to the terminal "d" of a time delay switch 414. The terminal "b" of this switch is connected to the terminal "B" of the solenoid valve 30, and the terminal "a" of the switch is connected to the solenoid valve terminal "A." The terminal "c" of the time delay switch 414 is connected to the common junction of the source 90 and the ice level switch 92. The brush 410 engages an annular conductive ring "A" on the commutator 406, and this brush maintains electric contact with the ring "A" for any angular position of the commutator. The brush 408, on the other hand, engages a conductive segment "B" on the commutator only when the platform is in the illustrated position. The conductive segment "B" is connected to the ring "A," so that a contact is established between the brushes 408 and 410 when the platform 400 is in its illustrated position.

An electrically driven mechanical ice crusher 412 of any known construction is mounted on one end of the platform 400 to be under the platform and remote from the outlet of the freezing compartment 20 of the evaporator 18 when the platform is in its illustrated first position. However, when the platform is rotated to its second position, the ice crusher 412 is brought into the position shown by the dashed line to be aligned with and adjacent the outlet of the freezing compartment so that the cylinders of ice issuing from the freezing compartment pass through the ice crusher to be crushed thereby.

The ice crusher 412 has an electric driving motor 416. One terminal of motor 416 is connected to the terminal "B" of the solenoid valve 30 and the other terminal of motor 416 is connected to a brush 418 associated with the commutator 406. The brush 418 engages the conductive segment "B" on the commutator when the platform 400 is in its second position. The arrangement is such that when the platform 400 is turned to its second position to bring the ice crusher 412 into alignment with the outlet of the freezing compartment 20, the unit 84 is disconnected from the circuit and the motor 416 of the ice crusher is conditioned for energization; and when the platform is turned to its first position, the motor 416 of the ice crusher 412 is disconnected and the unit 84 is conditioned for energization.

As in the embodiment of Figure 1, the terminal "A" of the solenoid valve 30 is connected to the source 90 through the plunger switch 62 and through the level switch 92 in the bin 86. The connection of the solenoid 30 to the ice cutting unit 84 and to the motor of the ice crusher unit 412 assures that these units will only be energized during the discharge operation, as is desired. The time delay switch 414 may be of any suitable construction, and it normally connects the commutator brush 410 to the source 90 through its closed contacts "c" and "d" to energize either the unit 84 and the motor 416, depending on the position of the commutator 406. However, when the solenoid 30 is deenergized at the end of an ice discharge operation, the energizing element of the switch 414 (which is connected between its terminals "a" and "b") is deenergized. After a selected time interval the connection between the terminals "c" and "d" of the switch is broken. This provides a means for keeping the unit 84 or the unit 412 energized for a required time after the valve 30 has become deenergized. The connecting element in the switch 414 may be thermally controlled, or it may be controlled by a slow-break relay or other suitable device. The circuit is then broken to the commutator 406, and the circuit is not restored until the valve 30 is again energized to energize and close the time delay switch 414.

When the platform 400 is in its illustrated first position, the unit 84 is energized through the commutator 406 whenever the solenoid valve 30 is energized. Therefore, the ice cutting unit 84 is energized at the end of each freezing cycle to prepare it to cut the ice cylinders into cubes as these cylinders are ejected from the evaporator freezing compartment. On the other hand when the platform 400 is turned to its second position, the ice crusher 412 is electrically connected across the valve 30, and at the end of each freezing cycle, the motor 416 is energized to cause the ice crusher to deliver crushed ice to the bin 86 through the deenergized heating elements of the unit 84. The time delay switch 414 functions to delay the deenergizing of the unit 84 or of the unit 412 at the end of each discharge operation and when the valve 30 is deenergized. This delay is made sufficiently long so as to enable these units to complete their operation on the ice cylinder and so that the entire ice cylinder then being processed will be cut or crushed and deposited in the bin 86 of Figure 1.

The invention provides, therefore, relatively inexpensive machinery for producing ice cubes or crushed ice on an entire automatic basis. The apparatus is inherently simple and foolproof in its operation and is well suited for many commercial or private applications and uses.

Although the now preferred embodiments of the present invention have been shown and described herein, it is to be understood that the invention is not to be limited thereto, for it is susceptible to changes in form and detail within the scope of the appended claims.

I claim:

1. Ice making apparatus including an evaporator having a freezing compartment therein, said freezing compartment being inclined to the horizontal with its inlet disposed above its outlet, a cover member for the outlet of said freezing compartment having an aperture, means for circulating water to be frozen through said inlet into said freezing compartment and out the aperture in said cover, and means responsive to the termination of the flow of water out said aperture in said cover to initiate a discharge operation for the ice formed in said freezing compartment.

2. Ice making apparatus including an evaporator having a freezing compartment therein, said freezing compartment being inclined to the horizontal with its inlet disposed above its outlet, a refrigerating system associated with said evaporator, a cover member for the outlet of said freezing compartment having an aperture, means for circulating water to be frozen through said inlet into said freezing compartment and out the aperture in said cover, first control means responsive to the termination of the flow of water out said aperture in said cover to open said cover, and second control means responsive to the opening of said cover for deactivating said circulating means and for causing said refrigerating system to warm the walls of said freezing compartment and free the ice formed in said freezing compartment so as to enable such ice to be discharged by gravity through the outlet of said compartment.

3. Ice making apparatus including an evaporator having a tubular freezing compartment therein, said freezing compartment being inclined to the horizontal with its inlet disposed above its outlet, a refrigerating system associated with said evaporator and including expansion means for permitting refrigerant to expand into said evaporator and cool said freezing compartment and further including by-passing means controlled by solenoid-activated valve for feeding hot refrigerant directly to said evaporator to warm the walls of said freezing compartment, a pivotally mounted flap cover member for the outlet of said freezing compartment having an aperture, means for circulating water to be frozen through said inlet into said freezing compartment and out the aperture in said flap, a first control system for opening said flap, a first electric switch responsive to the termination of the water flow out the aperture in said flap for activating said first control system to open said flap, a second control system for energizing said solenoid-actuated valve and for de-activating said water circulating means, and a second electric switch responsive to the opening of said flap for activating said second control system.

4. The apparatus defined in claim 3 in which said first control system includes a hydraulically operated actuating mechanism coupled to said flap, a conduit from said circulating means to said actuating mechanism, and a solenoid-actuated valve operated by said first electric switch for normally maintaining said conduit in a closed condition.

5. Ice making apparatus including an evaporator having a tubular freezing compartment therein, said freezing compartment being inclined to the horizontal with its inlet disposed above its outlet, a refrigerating system associated with said evaporator, an electric control circuit for causing said refrigerating system to warm the walls of said freezing compartment, a pivotally mounted flap cover member for the outlet of said freezing compartment having an aperture, means including an electrically operated pump for circulating water to be frozen through said inlet into said freezing compartment and out the aperture in said flap, electrically controlled means for opening said flap, an electric flow switch responsive to the termination of water flow through said aperture in said flap for energizing said electrically controlled means to open said flap, and a single-pole-double-throw switch actuated by the opening of said flap to energize said first mentioned electric control circuit and to deenergize said circulating pump.

6. Ice making apparatus including a plurality of freezing compartments each inclined to the horizontal and each having its inlet disposed above its outlet, a corresponding plurality of cover members for the respective outlets of said freezing compartments and each of said cover members having an aperture, means for circulating water to be frozen through said inlets into said freezing compartments and out the apertures in said covers, and means responsive to the termination of the flow of water out of said apertures in said covers to open said covers and initiate a discharge operation for the ice formed in said freezing compartments, and a control mechanism responsive to the discharge of the ice from all of said freezing compartments for closing said covers.

7. Ice making apparatus including a plurality of freezing compartments each inclined to the horizontal and each having its inlet disposed above its outlet, a refrigerating system associated with said freezing compartments, an electric control circuit for causing said refrigerating system to warm the walls of said freezing compartments, a corresponding plurality of pivotally mounted flap cover members for the respective outlets of said freezing compartments each having an aperture, said flaps being mechanically intercoupled to open and close in unison, means including at least one electrically operated pump for circulating water to be frozen through the inlets into said freezing compartments and out the apertures in said flaps, electrically controlled means for opening said flaps, an electric flow switch responsive to the termination of water flow through said apertures in said flaps for energizing said electrically controlled means to open said flaps and for energizing said first mentioned control circuit and deenergizing said circulating pump, and a control mechanism responsive to the discharge of ice from all of said freezing compartments to close said flaps and to deenergize said control circuit and energize said pump.

8. Ice making apparatus including a plurality of freezing compartments each inclined to the horizontal and each having its inlet disposed above its outlet, a refrigerating system associated with said freezing compartments, an electric control circuit for causing said refrigerating system to warm the walls of said freezing compartments, a corresponding plurality of pivotally mounted flap cover members for the respective outlets of said freezing compartments each having an aperture, said flaps being mechanically intercoupled to open and close in unison, means including at least one electrically operated pump for circulating water to be frozen through the inlets into said freezing compartments and out the apertures in said flaps, electrically controlled means for opening said flaps, an electric flow switch responsive to the termination of water flow through said apertures in said flaps for energizing said electrically controlled means to open said flaps, a plurality of latching mechanisms for respectively engaging said flaps to hold the same in an open position; a control switch actuated when said flaps are opened for energizing said first mentioned control circuit and for deenergizing said circulating pump, and a plurality of control mechanisms respectively associated with said latching mechanisms for individually unlatching said flaps as ice is discharged from corresponding ones of said freezing compartments.

9. Ice making apparatus including a plurality of freezing compartments each inclined to the horizontal and each having its inlet disposed above its outlet, a refrigerating system associated with said freezing compartments, an electric control circuit for causing said refrigerating system to warm the walls of said freezing compartments, a corresponding plurality of pivotally mounted flap cover members for the respective outlets of said freezing compartments each having an aperture, said flaps being mechanically intercoupled to open and close in unison, means including at least one electrically operated pump for circulating water to be frozen through the inlets into said freezing compartments and out the apertures in said flaps, an electrically controlled servo motor for opening and closing said flaps, an electric control system including an electric flow switch responsive to the termination of water flow through said apertures in said flaps for energizing said motor to open said flaps, said control system also energizing said refrigerating system control circuit and deenergizing said circulating pump in response to the termination of water flow through said apertures, and a further control system responsive to the discharge of ice from all said freezing compartments to energize said motor and close said flaps and to deenergize said refrigerating system control system and energize said circulating pump.

10. The apparatus defined in claim 1 and which further includes a bin for receiving ice from said freezing compartment, an electric ice-cutting unit disposed over said bin, a platform disposed between the outlet of said freezing compartment and said bin for transporting ice to said electric ice-cutting unit, in which said platform is rotatable, and which includes an ice-crushing unit mounted on said platform and which may be brought from an inoperative position to an operative position with respect to ice issuing out of said outlet of said freezing compartment upon rotation of said platform from a first position to a second position.

11. The apparatus defined in claim 10 and which includes commutator means mechanically coupled to said platform to cause said ice-cutting unit to be energized when said platform is in its first position and to cause said ice-crushing unit to be energized when said platform is rotated to its second position.

12. Ice making apparatus including an evaporator having a freezing compartment therein, said freezing compartment having an inlet and an outlet, a sump tank for holding water, means for circulating the water held in the sump tank from said sump tank and through said inlet and into said freezing compartment and out of said outlet with a portion of the water circulated through the freezing compartment being frozen upon the passage of the water through the freezing compartment, means for initiating a discharge operation for ice formed in said freezing compartment after a predetermined quantity of ice has been formed and such formation occurring with a residual amount of circulated water remaining in the apparatus, means for returning the residual amount of water in the apparatus to said sump tank at an initiation of the discharge operation, and means associated with the sump tank for draining the tank upon the return of such residual water to the tank.

References Cited in the file of this patent

UNITED STATES PATENTS

| | | |
|---|---|---|
| 2,633,004 | Leeson | Mar. 31, 1953 |
| 2,633,005 | Lauer | Mar. 31, 1953 |
| 2,643,524 | Wilbushewich | June 30, 1953 |
| 2,645,910 | Leeson | July 21, 1953 |
| 2,741,096 | Fitzner | Apr. 10, 1956 |
| 2,747,375 | Pichler | May 29, 1956 |